United States Patent [19]
Reeves et al.

[11] Patent Number: 5,842,375
[45] Date of Patent: Dec. 1, 1998

[54] CALIBRATION METHOD FOR TRANSMISSION CONTROL CLUTCHES

[75] Inventors: William Edward Reeves, Coffeyville; Kevin Lee Vaughters, Altamont; George William Detrick, III, Coffeyville; Norval Thomas Gruver, Independence; Briton Todd Eastman, Coffeyville, all of Kans.

[73] Assignee: Deere & Company, Moline, Ill.

[21] Appl. No.: 800,431

[22] Filed: Feb. 18, 1997

[51] Int. Cl.⁶ .............................. F16D 21/04; F16H 59/00
[52] U.S. Cl. .............................. 74/335; 74/336 R; 477/78
[58] Field of Search .................................. 74/335, 336 R, 74/731.1; 477/78, 97

[56] References Cited

U.S. PATENT DOCUMENTS

| | | | |
|---|---|---|---|
| 4,646,891 | 3/1987 | Braun | 74/335 |
| 4,856,913 | 8/1989 | Brekkestran et al. | 74/335 |
| 4,899,858 | 2/1990 | Cote et al. | 74/335 |
| 4,967,385 | 10/1990 | Brekkestran et al. | 74/335 |
| 4,989,471 | 2/1991 | Bulgrien | 74/336 R |
| 5,082,097 | 1/1992 | Goeckner et al. | 74/335 |
| 5,224,577 | 7/1993 | Fapck et al. | 74/335 |
| 5,249,658 | 10/1993 | Goeckner et al. | 74/336 R |
| 5,337,871 | 8/1994 | Testerman | 74/336 R |
| 5,737,979 | 4/1998 | McKenzie et al. | 74/731.1 |

OTHER PUBLICATIONS

Abandoned U.S. Application Ser. No. 521,504, filed May 10, 1990.

*Primary Examiner*—Khoi Q. Ta

[57] ABSTRACT

The hydraulically operated clutch elements of a powershift transmission have hold pressures and fast-fill times which are calibrated as a function of the rotation speed of an internal component of the transmission. The engine speed remains substantially constant and no or substantially no torque is transmittted to the output shaft of the transmission.

20 Claims, 10 Drawing Sheets

Microfiche Appendix Included
(1 Microfiche, 39 Pages)

CALIBRATION METHOD FOR TRANSMISSION CONTROL CLUTCHES

BACKGROUND OF THE INVENTION

This application includes a microfiche appendix including one microfiche and 39 frames.

This invention relates to a transmission control system, and more particularly to a calibrating method for determining key parameters relating to the operation and control of the control clutches.

Some manufacturers have used versions of electrohydraulic transmission controls which include proportionally controlled valves. In such systems with proportional control valves it is possible and desirable to accurately control the torque of the clutches during engagement. While the electrical command supplied to the control valve may be very precise, manufacturing tolerances in the valves and transmission cause large variations on an actual vehicle. If it is known what electrical command corresponds to the initial clutch engagement pressure which causes a clutch to just begin carrying torque, then this command could be used to modify the shift command for that clutch during shifting to provide optimized control.

For example, U.S. Pat. No. 4,855,913, issued 8 Aug. 1989 to Brekkestran et al., discloses that the key parameters in the control system include the initial clutch engagement pressure (represented by DC-MAX) and the fast-fill clutch delay (represented by T1). The Brekkestran reference further states that DC-MAX and T1 must be determined by laboratory or field tests. However, the Brekkestran reference does not disclose any method for determining these values.

A calibrating method or a method of determining the pressure necessary to achieve clutch engagement in a microprocessor-based transmission control system is described in U.S. Pat. No. 4,989,471, issued on 5 Feb. 1991 to Bulgrien. The Bulgrien method includes braking the transmission output shaft, then gradually increasing the clutch pressure and saving a value corresponding to the clutch pressure at which the engine speed begins to decrease. However, this method relies upon the resistance to rotation due to use of the vehicle brakes to prevent rotation of the transmission output shaft. The Bulgrien patent also illustrates an alternate method of calibrating a clutch by sensing when the clutch transmits sufficient torque to move the vehicle. This alternate method requires that the vehicle be placed in a position where vehicle motion is not a safety concern, and the results of such a method will vary depending upon the terrain on which the vehicle is placed. The Bulgrien patent also depends on sensing variations in engine speed, and is therefore susceptible to variations in engines and engine governors.

U.S. Pat. No. 5,082,097, issued on 21 Jan. 1992 to Goeckner et al. discloses a calibrating system or a system for determining a current signal corresponding to the point at which the clutch begins to transmit torque. This system requires sensing either vehicle movement or engine speed droop, and thus depends on sensing variations in engine speed, and is therefore susceptible to variations in engines and engine governors, or requires possibly dangerous vehicle movement.

Another calibration method is described in U.S. Pat. No. 5,224,577, issued 7 Jun. 1993 to Falck et al. and assigned to the assignee of the present application. This method also involves sensing engine speed droop, and is therefore susceptible to variations in engines and engine governors.

Another calibration method is disclosed in U.S. Pat. No. 5,337,871, issued 16 Aug. 1994 to Testerman, and assigned to the assignee of the present application. However, this method requires pressure sensors, which are expensive, and which are not as accurate or reliable as rotation speed sensors.

SUMMARY OF THE INVENTION

An object of the present invention is to provide a method of calibrating or determining key parameters for the control of proportional control valves for a powershift transmission.

Another object of the invention is to provide a such method which is not effected by variations in engines and engine governors.

Another object of the invention is to provide a such method which does not require vehicle movement.

Another object of the invention is to provide a such method which does not require the use of pressure sensors.

Another object of the invention is to provide a such method which does not require transmission of substantial amounts of torque to the transmission output shaft.

These and other objects are achieved by the present invention wherein the transmission output shaft is prevented from turning by applying either the park brake or wheel brake. The engine is run at a constant rpm. For hold pressure calibration, the clutch to be calibrated either decelerates or accelerates an internal transmission component. This acceleration or deceleration is monitored to determine if the hold pressure has been achieved. The hold pressure is defined as that hydraulic pressure that when applied to the clutch initially transfers torque. To determine a fast-fill time, the clutch to be calibrated is filled in increasing increments of time until it engages, breaking loose another clutch which is maintained at hold pressure, thus accelerating an transmission component from zero speed. Substantial acceleration indicates the clutch is full and the fast-fill time has been reached. Alternatively, the clutch to be calibrated is also filled in increasing increments of time until it engages, breaking loose another clutch at hold pressure and decelerating an internal transmission component from a known speed. Substantial deceleration indicates the clutch is full and the fast-fill time has been reached. The fast-fill time is defined as the time required to nearly fill the clutch with full pressure applied to the clutch.

DETAILED DESCRIPTION

Figure 1:
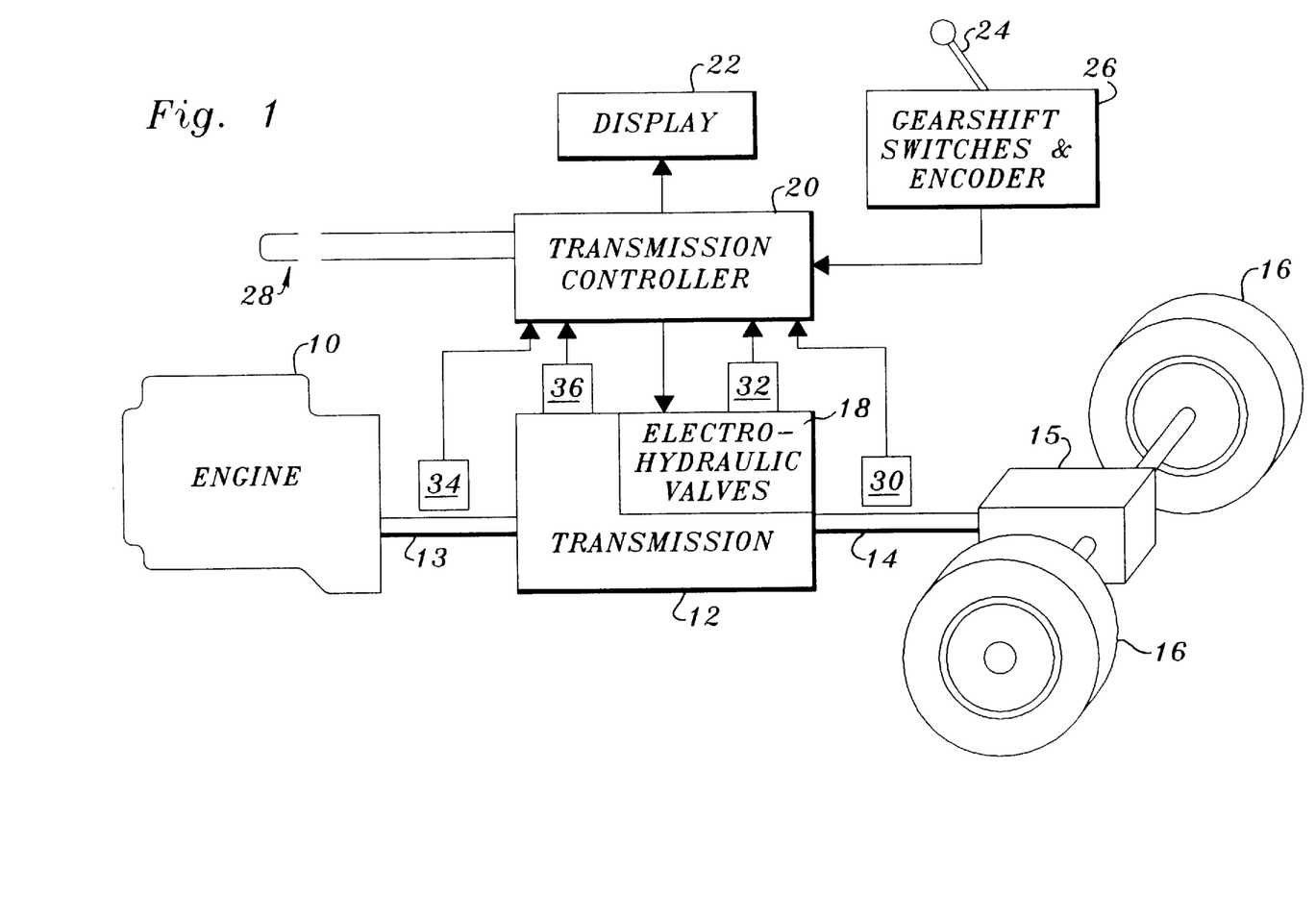
FIG. 1 is a schematic block diagram of a microprocessor-based transmission control system to which the present invention is applicable.

As shown in FIG. 1, a vehicle power train includes an engine 10 which drives, via input shaft 13, a power shift transmission 12, which, via output shaft 14 and differential 15, drives wheels 16. The power shift transmission 12 is operated by a set of electrohydraulic valves 18 which are controlled by signals from a microprocessor based transmission controller 20. The transmission 12 may be a transmission such as a DF150, DF250 AG150 or AG250 powershift transmission manufactured by Funk Manufacturing, Inc.

The transmission controller 20 is connected to a display 22 and to a gearshift lever 24 via a gearshift switch/encoder unit 26 such as commercially available from Funk Manufacturing for use with its production DF 150 and DF 250 powershift transmissions. The transmission controller 20 is also connected to an electrical jumper 28. Mag pickup rotation speed sensors 30, 32, 34 and 36 provide rotation speed signals to the controller 30, as will be described in more detain hereinafter.

The transmission control unit 20 includes a commercially available microprocessor (not shown) which, in response to connection of jumper 28, executes a computer program which implements operation of the calibration methods described hereinafter. The transmission control unit 20 also includes valve drivers (not shown) which provide variable duty cycle pulse-width-modulated voltage control signals to the valves 18. The transmission control unit 20 and the valve drivers (not shown) will generate such control signals as a function of various sensed and operator determined inputs in order to achieve a desired pressure in the clutches and to thereby control the shifting of the transmission 12 in a desired manner. However, the present invention is not concerned with the control of the shifting of the transmission 12, the transmission 12 itself, or the valves 18, since the present invention is concerned only with the calibration of certain parameters. The method of the present invention is implemented by the control unit 20 which executes the computer program which is listed in the microfiche appendix. The computer program listing is in C language.

Figure 2:
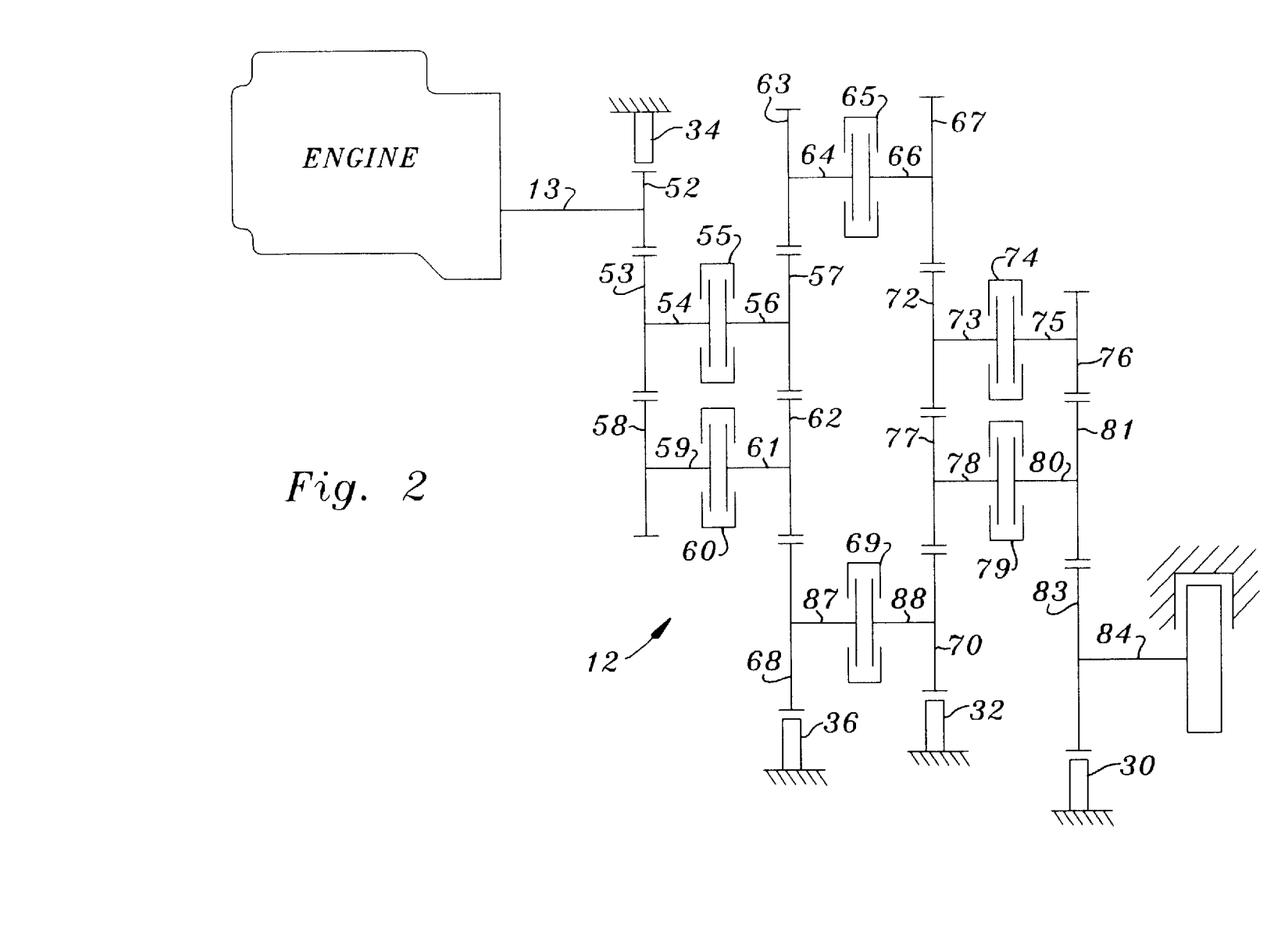
FIG. 2 is a schematic representation of a transmission to which the present invention is applicable.

Referring to FIG. 2, the transmission shown has 6 clutches 55, 60, 65, 69, 74 and 79. The input shaft 13 is mounted to gear 52 that meshes with gear 53 and 58. Shafts 54 and 56 turn the same speed when clutch 55 is fully engaged. Shafts 59 and 61 turn the same speed when clutch 60 is fully engaged. Shafts 64, 56, 61 and 87 are connected to gears 63, 57, 62 and 68 respectively. Shafts 64 and 66 turn the same speed when clutch 65 is engaged. Shafts 87 and 88 turn the same speed when clutch 69 is engaged. Shafts 73 and 75 turn the same speed when clutch 74 is engaged. Shafts 78 and 80 turn the same speed when clutch 79 is engaged. In order to transmit power from input shaft 13 to output shaft 14, three clutches need to be engaged: either 55 or 60, and either 65 or 69, and either 74 or 79. Gears 63, 57, 62, and 68 are in constant mesh as are gears 67, 72, 77 and 70.

Mag pickup speed sensor 30 monitors output speed. Mag pickup speed sensor 32 monitors the speed of gear 70 which also provides calculated speeds for gears 67, 72 and 77. Mag pickup speed sensor 34 monitors input speed. Mag pickup speed sensor 36 monitors the speed of gear 68 which also provides calculated speeds for gears 62, 57 and 63. Gear 76 is connected to shaft 75 and gear 81 is connects to shaft 80. Gears 76, 81 and 83 all mesh to provide power out at shaft 84. Each of clutches 55, 60, 65, 69, 74 and 79 are activated (engaged) with hydraulic pressure supplied from electrohydraulic valves 18.

CALIBRATION METHODS

Hold Pressure-Deceleration

Figures 3, 4B:
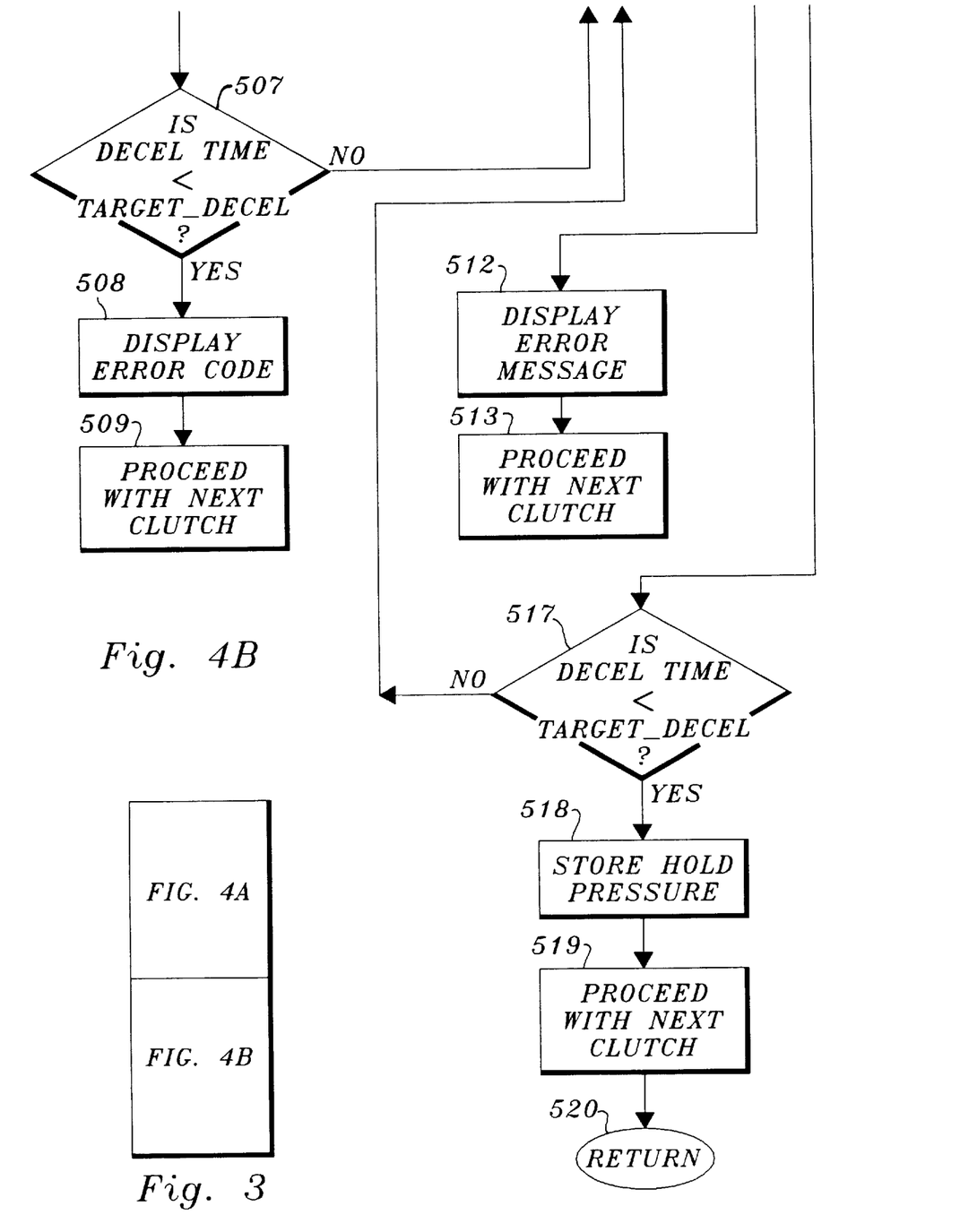
FIG. 3 illustrates the relationship between FIGS. 4A and 4B.
FIGS. 4A and 4B together comprise a simplified logic flow diagram illustrating a hold pressure calibration method of the present invention.
Figure 4A:
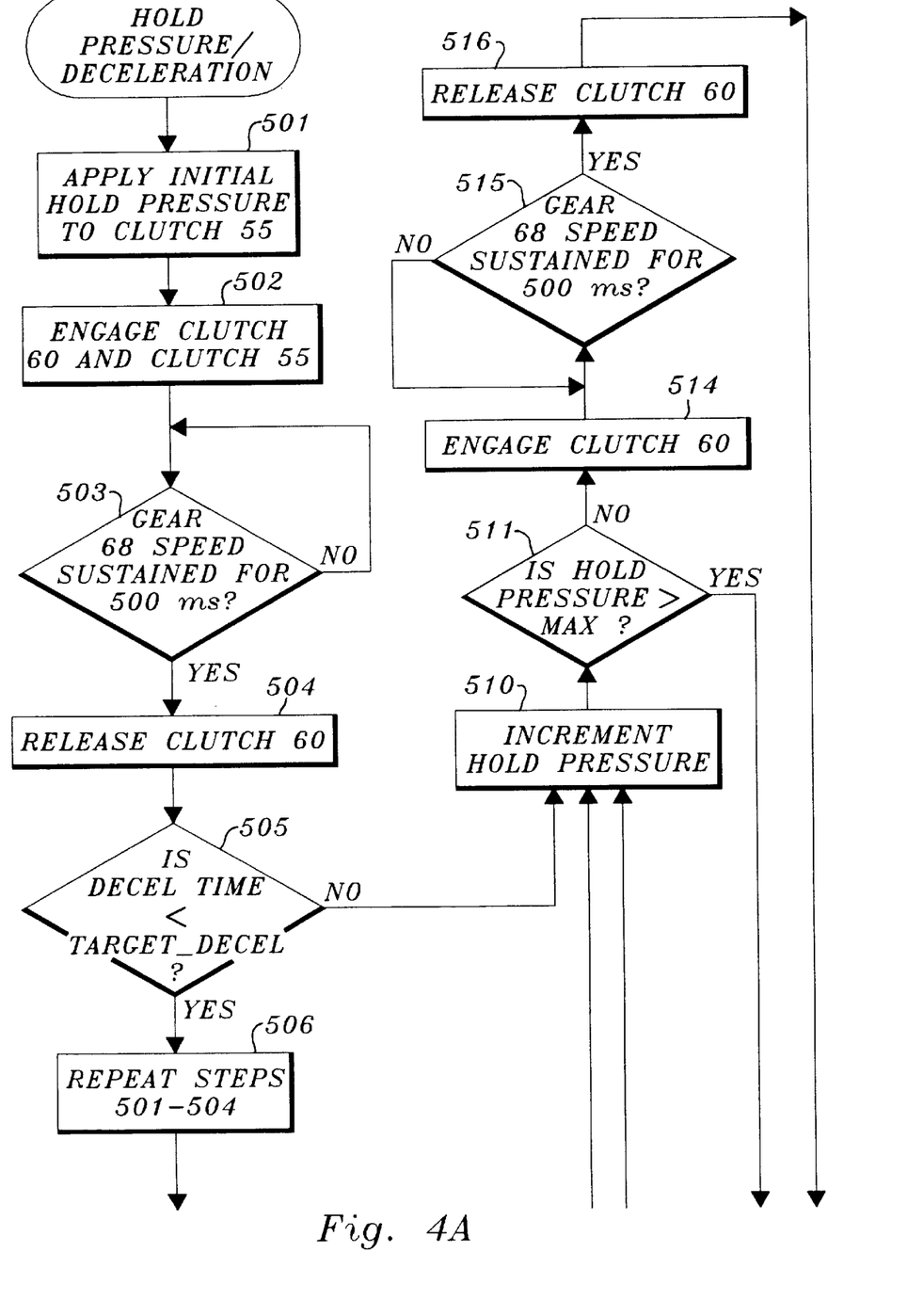

Referring now to FIGS. 3, 4A and 4B, the calibration method shown therein can be used to determine the hold pressures for all the clutches. The automatic calibration procedure is enabled by connecting the calibration jumper 28 to the transmission controller 20. Although not shown in FIG. 3, the controller continually checks to ensure the park brake (not shown) is applied, that oil temperature is above 69° F., that engine speed is running at about 1500 rpm, and that no sustained output shaft speed is detectable. If any of the checks determine a fault, the routine aborts. Once the calibration jumper 28 is installed and the engine speed and park brake are set, the shift lever 24 is moved from its neutral to its forward position to start the calibration process. Table 1 lists the clutch combinations for determining hold pressures for all the clutches.

TABLE 1

| Hold Pressure-Deceleration | | | |
|---|---|---|---|
| Clutch Calibrated | Clutch 1 | Clutch 2 | Gear Speed |
| 55 | 60 | 65 | 68 |
| 60 | 55 | 65 | 68 |
| 65 | 55 | 74 | 68 |
| 69 | 55 | 74 | 68 |
| 74 | 55 | 65 | 70 |
| 79 | 55 | 65 | 70 |

This calibration method will now be described for the calibration of clutch 55, with clutch 1 being clutch 60, clutch 2 being clutch 65 and with the speed of gear 68 being sensed by mag pickup 36. In step 501 a test hydraulic signal or an initial hold pressure, for example, 20 psi is applied to clutch 55. In step 502, clutches 60 and 65 are fully engaged, thus causing rotation of both the input and output elements of clutch 55 to rotate. Step 503 checks or senses speed sensor 36 to see if proper speed of gear 68 has been sustained for 500 milliseconds(ms). Once this gear speed has been sustained for 500 ms, clutch 60 is released in step 504.

The rotation speed of the gears and shafts connected to gear 68 will begin to slow down because of parasitic drag (friction) and because clutch 55 is partially engaged. Step 505 determines the amount of time (deceleration time) required for the rotation speed of gear 68 to decrease by a certain amount. In step 505, if the measured deceleration time is less than a stored reference time (target_decel), then step 506 causes steps 501–504 to be repeated. If in step 507 the deceleration time is again measured, and if it is still less than target_decel, then step 508 causes an appropriate error message to appear on display 22 and step 509 directs the routine to determine the hold pressure of another clutch.

If, in steps 505 or 507, the measured deceleration time is not less than target_decel then the routine proceeds to step 510, which increments the test hydraulic signal or the hold pressure by one increment. Step 511 checks to see if the hold pressure is greater than or equal to the maximum hold pressure allowable. If it is, step 512 causes an error message to be displayed and step 513 directs the routine to determine the hold pressure of another clutch. Otherwise, step 511 directs the algorithm to step 514 which re-engages clutch 60 so that the output of clutch 55 (shaft 56 and gear 57) will again be rapidly rotating. Step 515 then again checks or senses that a certain gear speed has been sustained for 500 ms, then step 516 releases clutch 60. Step 517 again compares deceleration time to target_decel time. If it is greater, then the routine proceeds to step 510 and increments the hold pressure.

Eventually, when the pressure applied to clutch 55 attains the hold pressure value, clutch 55 will begin to engage and will transmit torque to shaft 56 and gear 57 which tends to slow the rotation of gear 57 and cause gear 57 to rotate in a direction opposite to the rotation caused by the engagement of clutch 60. When this happens, in step 517, the measured deceleration time will be less than the target_decel time and the hold pressure is stored by step 518. Step 519 repeats steps 501 through 518 for other clutches to be calibrated. Thus, the hold pressure has been determined by sensing a rotation speed of an internal transmission component—gear 68, and without sensing engine speed droop and without causing vehicle movement.

Hold Pressure-Acceleration

Figures 5, 6B:
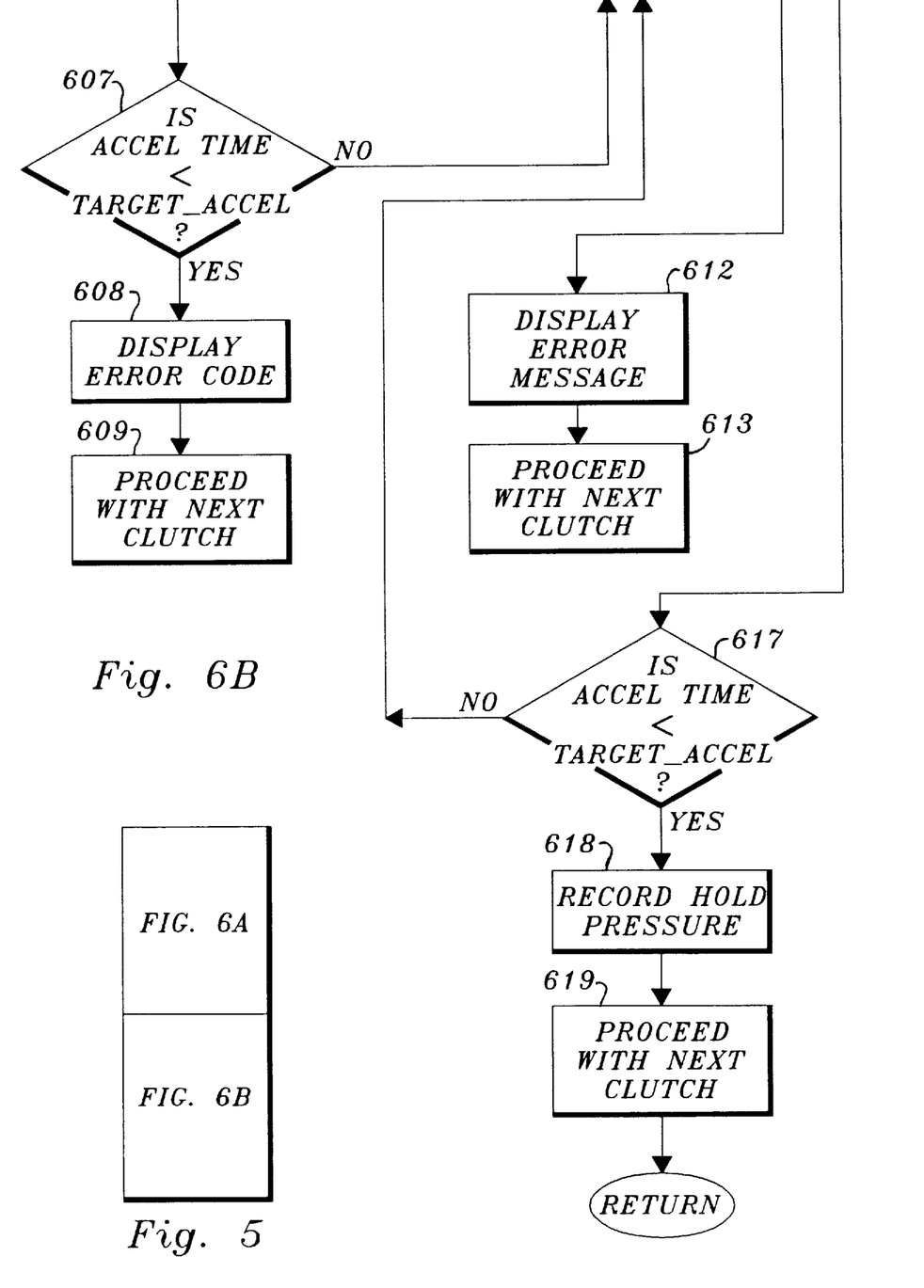
FIG. 5 illustrates the relationship between FIGS. 6A and 6B.
FIGS. 6A and 6B together comprise a simplified logic flow diagram illustrating an alternate hold pressure calibration method of the present invention.
Figure 6A:
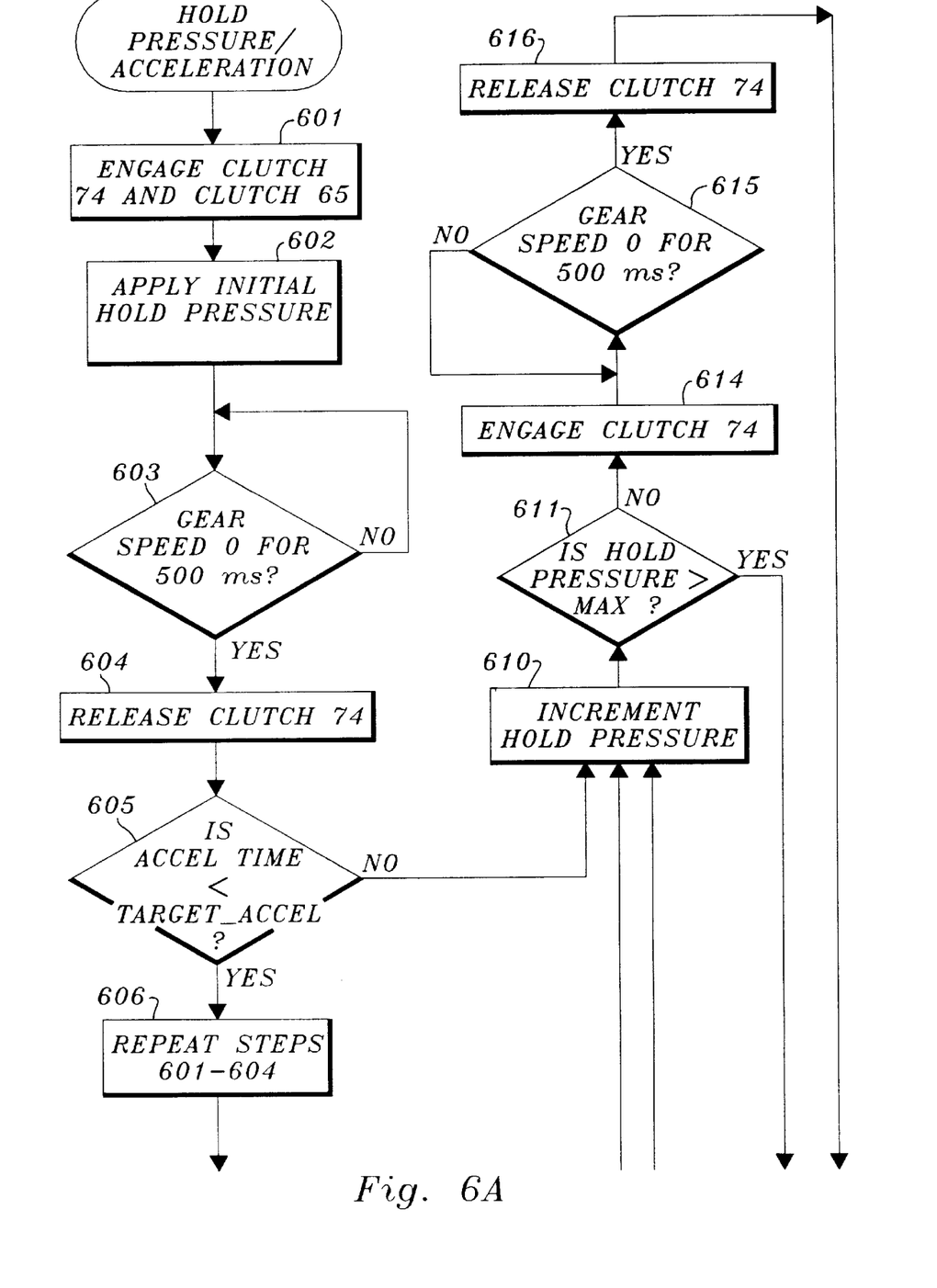

FIGS. 5, 6A and 6B show an alternate calibration method wherein hold pressure is determined by measuring the acceleration of an internal component of the transmission 12. For this particular transmission, this method may be applied to all clutches except 74 and 79. Table 2 lists the clutch combinations for determining hold pressures for clutches 55, 60, 65 and 69.

TABLE 2

| Hold Pressure-Acceleration | | | |
|---|---|---|---|
| Clutch Calibrated | Clutch 1 | Clutch 2 | Gear Speed |
| 55 | 74 | 65 | 68 |
| 60 | 74 | 65 | 68 |
| 65 | 74 | 55 | 70 |
| 69 | 74 | 55 | 70 |

FIGS. 6A and 6B will now be described for the calibration of clutch 55, with clutch 1 being clutch 74, clutch 2 being clutch 65 and with the speed of gear 68 being sensed by mag pickup 36. In step 601, clutch 74 and clutch 65 are fully engaged, thus preventing rotation of the output of clutch 55 and of gear 57. In step 602 an initial hold pressure or test hydraulic signal is applied to clutch 55. Step 603 checks or senses to verify the speed of gear 68 is 0 rpm for at least 500 ms. Step 604 releases clutch 74, allowing whatever torque is transmitted across clutch 55 to accelerate gear 68.

Step 605 measures the time it takes to accelerate the gear 68 up to a predetermined target speed for the initial hold pressure. If this time is less than the target_accel time then steps 601 through 604 are repeated in step 606. Step 607 measures the time it takes to accelerate gear 68 to the predetermined target speed. If this time is still less than the target acceleration time then step 608 displays on display 22 an appropriate error message and the routine continues on to finding the hold pressure of the next clutch in step 609.

If, in steps 605 or 607, the acceleration time to the predetermined speed is not less than target_accel time, then the routine proceeds to step 610 and hold pressure or test hydraulic signal is incremented and applied to clutch 55. Step 611 causes step 612 to display an error message if the hold pressure is greater than or equal to the maximum hold pressure, and the routine proceeds to the next clutch in step 613. Otherwise, step 614 engages clutch 74 and step 615 again checks or senses that the speed of gear 68 is 0 rpm for 500 ms, and the routine proceeds to step 616 where clutch 74 is released.

The releasing of clutch 74 allows whatever torque is transmitted across clutch 55 to accelerate gear 68. Step 617 again compares the measured acceleration time to the stored reference time (target_accel). If the measured acceleration time is greater than target_accel, it means that the pressure applied to clutch 55 has not started to engage it yet, and the hold pressure is incremented in step 610. The loop continues until the measured acceleration time is less than the target_accel time and the hold pressure is then stored as the calibration value by step 618. Step 619 repeats the process for the other clutches listed in Table 2.

It should be noted that with this method only a minimal torque is transmitted through clutch 55. This results in a very small effect on engine pull down so that the calibration results are not affected by variations in engine characteristics.

Fast Fill Time—Acceleration

Figures 7, 8B:
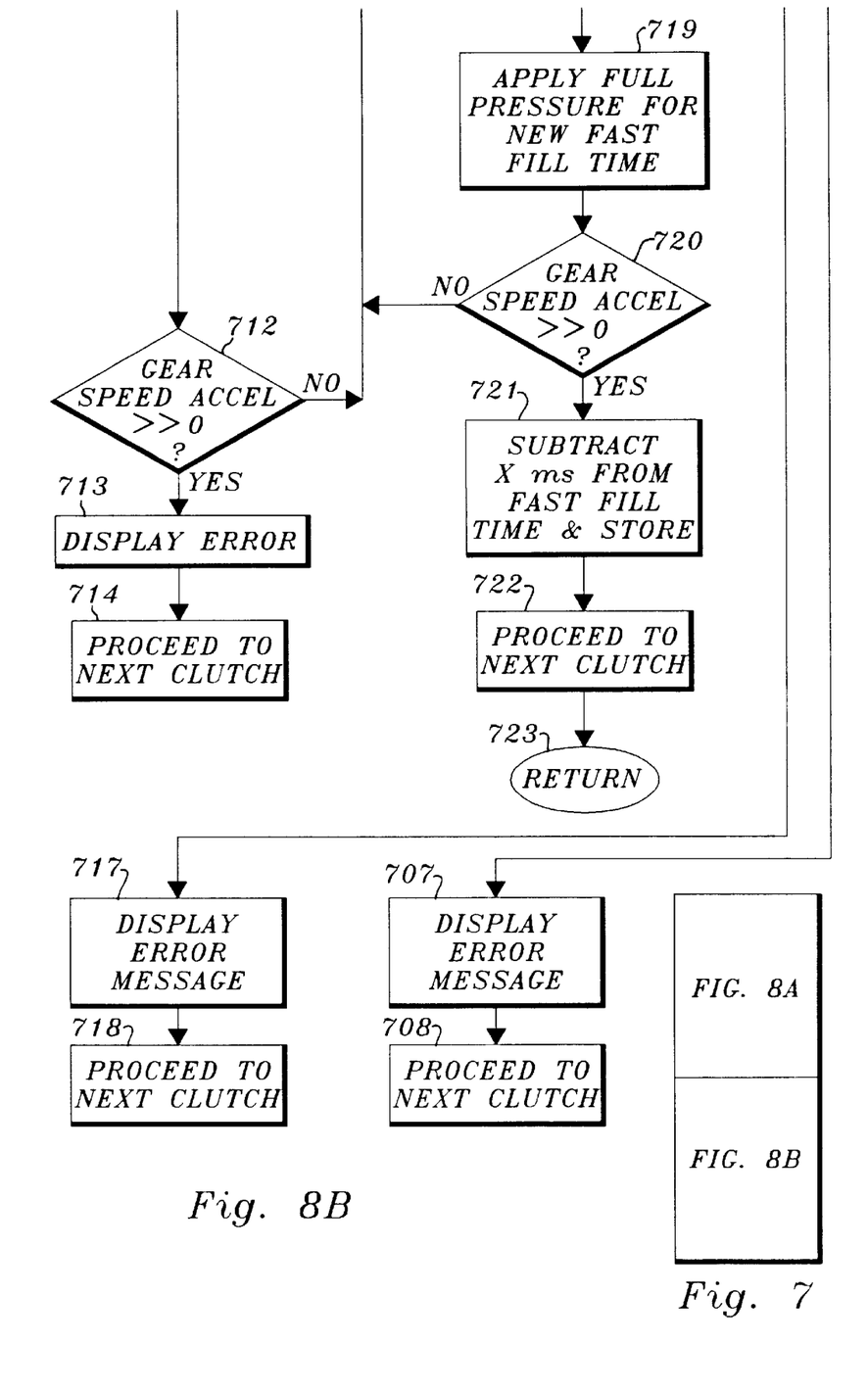
FIG. 7 illustrates the relationship between FIGS. 8A and 8B.
FIGS. 8A and 8B together comprise a simplified logic flow diagram illustrating a fast fill time calibration method of the present invention.
Figure 8A:
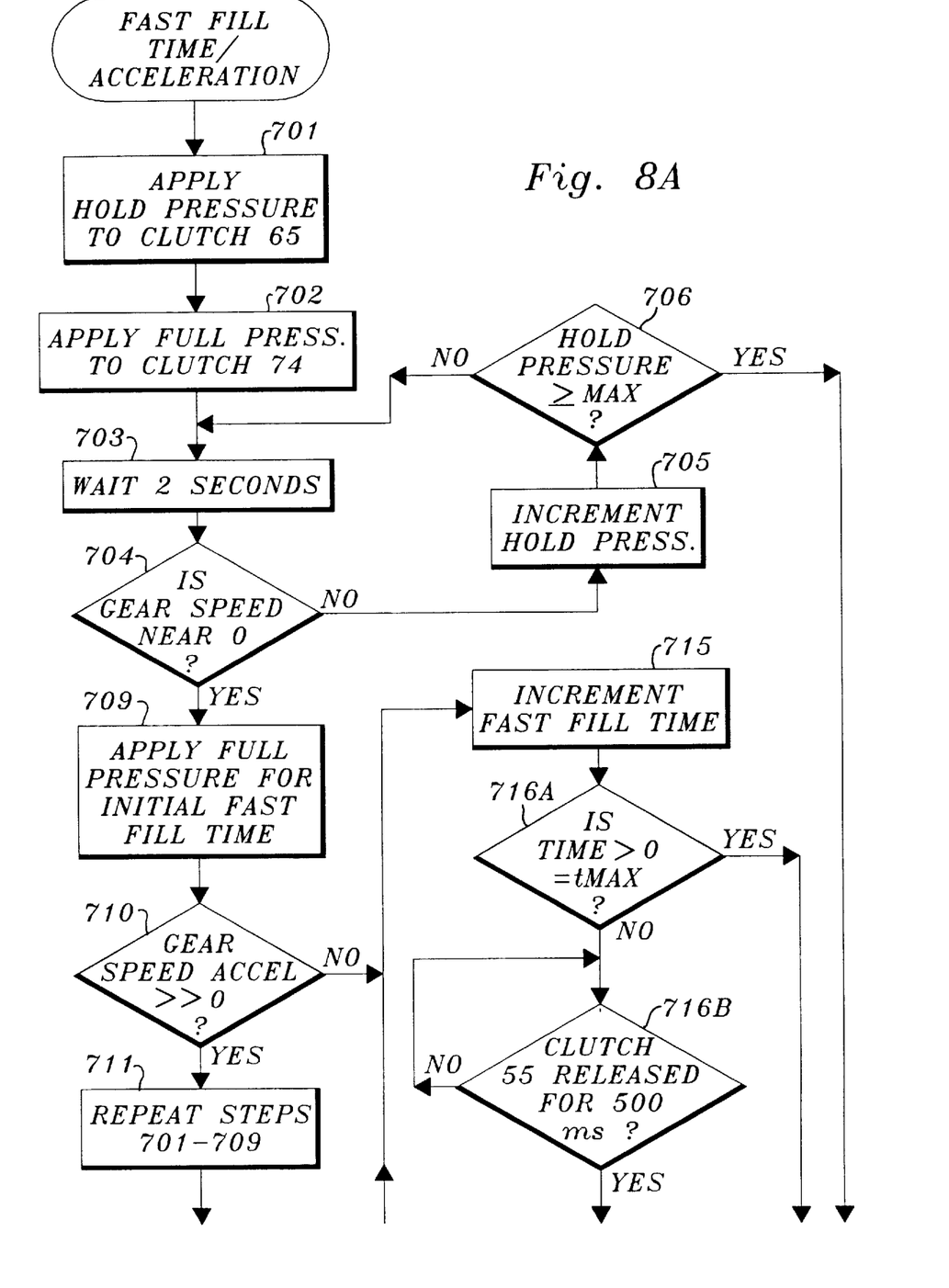

FIGS. 7, 8A and 8B show a calibration method wherein fast fill time is determined by measuring the acceleration of an internal component of the transmission 12. For this particular transmission, this method may be applied to all clutches except 74 and 79. Table 3 lists the clutch combinations for determining fast fill times for clutches 55, 60, 65 and 69.

TABLE 3

| Fast Fill Time - Acceleration | | | |
|---|---|---|---|
| Clutch Calibrated | Clutch 1 | Clutch 2 | Gear Speed |
| 55 | 65 | 74 | 68 |
| 60 | 65 | 74 | 68 |
| 65 | 74 | 55 | 70 |
| 69 | 74 | 55 | 70 |

FIGS. 8A and 8B will now be described for the calibration of clutch 55, with clutch 1 being clutch 65, clutch 2 being clutch 74 and with the speed of gear 68 being sensed by mag pickup 36. Step 701 applies to clutch 65 its previously determined hold pressure (this limits the amount of torque which can be transferred to output shaft 14). Step 702 applies full pressure to clutch 74 (this prevent rotation of the output of clutch 65). After waiting 2 seconds in step 703, a check is made for 0 speed of gear 68 in step 704. If gear speed is not correct then clutch 65 hold pressure is incremented by one unit in step 705 and step 706 checks if hold pressure has exceeded the maximum allowable. If it has, then step 707 displays an error message and step 708 proceeds in finding the fast fill time of the next clutch. If the maximum hold pressure is not exceeded in step 706, then upon waiting 2 seconds in step 703, gear 68 speed is checked or sensed again in step 704. This loop continues until near 0 gear speed is achieved or maximum clutch 65 hold pressure is reached.

Once near 0 gear speed is established, step 709 applies a test hydraulic signal or full pressure to clutch 55 for an initial test period of time after which time clutch 55 is fully released. Step 710 checks if gear 68 speed has accelerated significantly from 0. This occurs if enough oil fills the clutch 55 to force its piston (not shown) against its plates (not shown) to start transferring torque. If enough torque is transferred across clutch 55, this torque will overcome the hold pressure in clutch 65 and cause gears 63, 57, 62 and 68 to accelerate from 0. If gear 68 speed does accelerate significantly from 0 then steps 701 through 710 are repeated in step 711. Another check is performed in step 712 and if gear speed is still significantly above 0 then an appropriate error message is displayed in step 713 and the routine proceeds to finding the fast fill time for the next clutch in step 714.

If, in steps 710 or step 712, the gear 68 speed has not significantly accelerated above 0 then step 715 increases the fast fill time period by a small increment, for example, 5 ms. If this incremented time period exceeds a maximum time, steps 716A and 717 display an error message and step 718 proceeds to finding the fast fill time of the next clutch. Otherwise, step 716B delays until pressure has been released from clutch 55 for at least 1250 ms. Then step 719 applies full pressure to clutch 55 for the incremented fast fill time period after which it is released, and step 720 checks if the gear 68 speed has accelerated. If not, steps 715–720 are repeated. Eventually, when the fast fill time period becomes long enough, clutch 55 will be filled, gear 68 will accelerate and step 720 will direct the algorithm to step 721 which subtracts a small empirically determined time increment from the fast fill time previously set by step 715, and this modified fast fill time is stored as the calibration fast fill time for clutch 55. The empirically determined amount x is subtracted from the fast fill time so that the clutch 55 will not be completely full at the end of the fast fill time. The procedure is repeated for the next clutch in step 722 until the fast fill time using the acceleration method has been determined for all desired clutches.

Fast Fill Time—Deceleration

Figures 9, 10B:
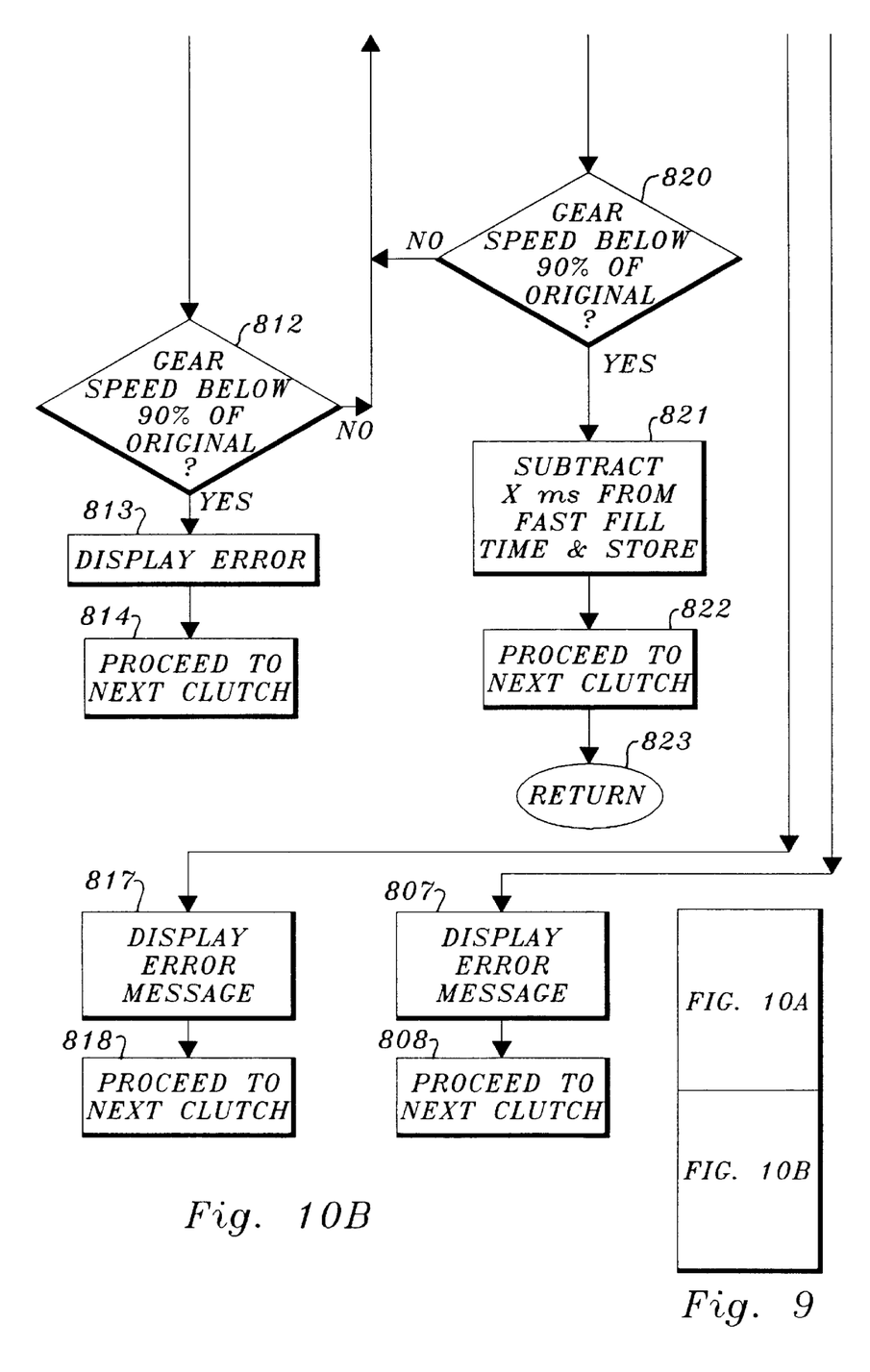
FIG. 9 illustrates the relationship between FIGS. 10A and 10B.
FIGS. 10A and 10B together comprise a simplified logic flow diagram illustrating an alternate fast fill time calibration method of the present invention.
Figure 10A:
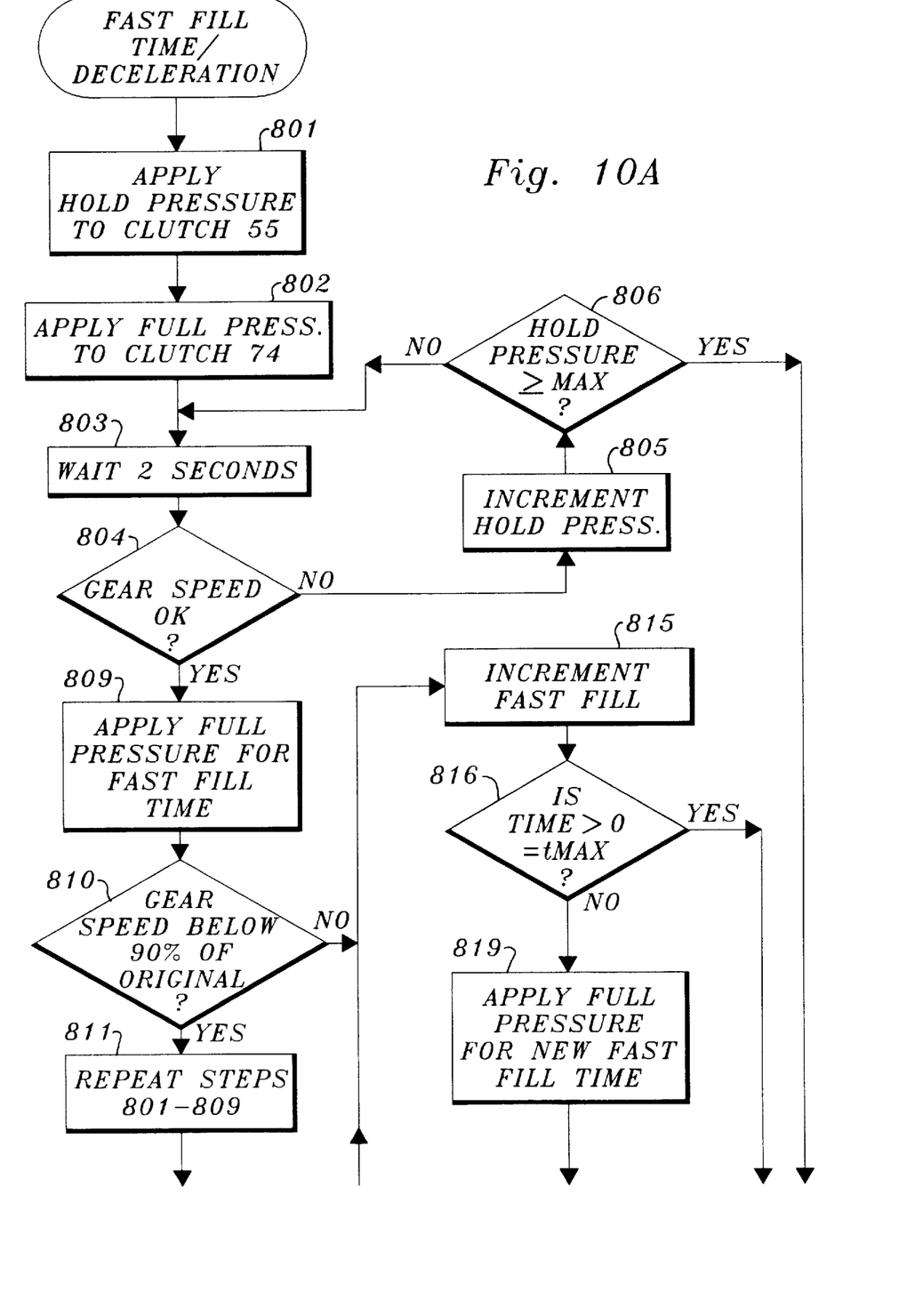

FIGS. 9, 10A and 10B show a calibration method wherein fast fill time is determined by measuring the deceleration of an internal component of the transmission 12. For this particular transmission, this method may be applied to all clutches except 55 and 60. Table 4 lists the clutch combinations for determining fast fill times for clutches 65, 69, 74 and 79.

TABLE 4

Fast Fill Time - Deceleration

| Clutch Calibrated | Clutch 1 | Clutch 2 | Gear Speed |
|---|---|---|---|
| 65 | 55 | 74 | 68 |
| 69 | 55 | 74 | 68 |
| 74 | 65 | 55 | 70 |
| 79 | 65 | 55 | 70 |

FIGS. 10A and 10B will now be described for the calibration of clutch 65, with clutch 1 being clutch 55, clutch 2 being clutch 74 and with the speed of gear 68 being sensed by mag pickup 36. Step 801 applies to clutch 55 its previously determined hold pressure. Step 802 applies full pressure to clutch 74. This transmits a small amount of torque to the input of clutch 65 and locks the output element of clutch 65. After waiting 2 seconds in step 803, a check is made of proper gear 68 speed, or gear 68 speed is sensed in step 804. If gear 68 speed is not correct then clutch 55 hold pressure is incremented by one unit in step 805 and step 806 checks if hold pressure has exceeded the maximum allowable. If it has, step 807 displays an error message and step 808 proceeds in finding the fast fill time of the next clutch. If the maximum hold pressure is not exceeded in step 806, then upon waiting 2 seconds in step 803 gear 68 speed is checked again in step 804. This loop continues until proper gear 68 speed is achieved or maximum allowable clutch 55 hold pressure is reached.

Once proper gear 68 speed is established, step 809 applies a test hydraulic signal or full pressure to clutch 65 for an initial fast fill time period, after which clutch 65 if fully released. Then, step 810 checks or senses if gear 68 speed has decelerated below 90% of its original speed. If so, it means that enough oil fills the clutch 65, so that, because the output of clutch 65 is locked, clutch 65 will overcome clutch 55 at hold pressure, and slow down the rotation of gears 63, 57, 62 and 68. If gear 68 speed decelerates below 90% of its original value, then step 811 causes steps 801 through 810 to be repeated. Another check, or speed sensing is performed in step 812 and if gear speed 68 is still below 90% of its original value then step 813 displays an error message and step 814 directs the routine to determine the fast fill time for the next clutch.

If, in steps 810 or 812, the gear 68 speed has not decelerated to 90% of its original speed, then step 815 increments the fast fill time the value by 5 ms. This new fast fill time is checked to ensure that it does not exceed the maximum time allowed in step 816. If it does, then step 817 displays an error message and step 818 proceeds to finding the fast fill time of the next clutch. Otherwise, then step 819 applies a test hydraulic signal or full pressure to clutch 65 for the new fast fill time determined in step 815. Steps 815–820 are repeated until gear 68 speed decelerates to less than 90% of its original speed. Once this occurs, step 821 subtracts a small time increment from the fast fill time, and this modified value is stored as the fast fill time value for clutch 65.

A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A method of calibrating a control clutch of a transmission having an input shaft connected to an engine and having an output shaft, the transmission have a plurality of control clutches, each control clutch having an input element for receiving torque and having an output element, the method comprising the following steps:
   a) maintaining the engine at a substantially constant speed;
   b) applying a test hydraulic signal to the clutch being calibrated;
   c) sensing a rotation speed of an internal transmission component other than the transmission input and output shafts;
   d) analyzing a parameter which is a function of the sensed rotation speed, and
   e) if the analysis satisfies a predetermined criteria storing a value associated with the applied test pressure signal as the calibration value; and f) if the analysis does not satisfy said predetermined criteria, modifying the test hydraulic signal and repeating steps b) through f).

2. The method of claim 1, further comprising: maintaining the transmission in a state such that substantially no torque is transmitted to the output shaft.

3. The method of claim 1, comprising:
a) applying a hold pressure to the clutch being calibrated;
b) fully engaging at least a second clutch so that all parts of the clutch being calibrated are rotating;
c) fully disengaging the second clutch;
d) sensing a rotation speed of an internal transmission component driven by the output element of the clutch being calibrated;
e) analyzing the sensed rotation speed, and
f) if the analysis satisfies a predetermined criteria storing a value associated with the applied hold pressure as the calibration value; and
g) if the analysis does not satisfy said predetermined criteria, modifying the hold pressure and repeating steps b) through g).

4. The method of claim 3, wherein the analyzing step comprises:
determining the time required for the sensed rotation speed to decrease by a certain amount; and
comparing the determined time period to a stored reference time period.

5. The method of claim 1, comprising:
a) fully engaging at least a second clutch to prevent rotation of the output element of the clutch being calibrated;
b) applying a hold pressure to the clutch being calibrated;
c) fully disengaging the second clutch;
d) sensing a rotation speed of a transmission element driven by the output element of the clutch being calibrated;
e) analyzing the sensed rotation speed, and
f) if the analysis satisfies a predetermined criteria storing a value associated with the applied hold pressure as the calibration value; and
g) if the analysis does not satisfy said predetermined criteria, modifying the hold pressure and repeating steps b) through g).

6. The method of claim 5, wherein the analyzing step comprises:
determining the time required for the sensed rotation speed to increase by a certain amount; and
comparing the determined time period to a stored reference time period.

7. The method of claim 5, further comprising:
between steps b) and c), sensing a rotation speed of a transmission element driven by the output element of the clutch being calibrated and preventing further operation of the method unless the sensed speed is less than a predetermined speed for a certain time period.

8. The method of claim 1, comprising:
a) applying a hold pressure to a second clutch which is coupled to the output element of the clutch being calibrated, the hold pressure being a pressure at which the second clutch begins to transmit torque therethrough;
b) applying full pressure to a third clutch coupled to the output element of the second clutch to prevent rotation of the output element of the second clutch;
c) applying full pressure to the clutch being calibrated for a fast-fill time period and applying sump pressure to the clutch being calibrated thereafter;
d) sensing a rotation speed of a transmission element driven by the output element of the clutch being calibrated;
e) analyzing a parameter which is a function of the sensed rotation speed, and if the analysis satisfies a predetermined criteria storing a value associated with the fast-fill time period as the calibration value, and if the analysis does not satisfy said predetermined criteria, modifying the fast-fill time period and repeating steps c) through e).

9. The method of claim 8, wherein the analyzing step comprises:
comparing the sensed rotation speed to a stored reference speed.

10. The method of claim 1, comprising:
a) applying a hold pressure to a second clutch which is coupled to the input element of the clutch being calibrated, the hold pressure being a pressure at which the second clutch begins to transmit torque therethrough;
b) applying full pressure to a third clutch coupled to the output element of the clutch being calibrated to prevent rotation of said output element;
c) applying full pressure to the clutch being calibrated for a fast-fill time period and connecting the clutch being calibrated to sump pressure thereafter;
d) sensing a rotation speed of a transmission element driven by the input element of the clutch being calibrated;
e) analyzing the sensed rotation speed, and if the analysis satisfies a predetermined criteria storing a value associated with the fast fill time period as the calibration value, and if the analysis does not satisfy said predetermined criteria, modifying the fast fill time period and repeating steps c) through e).

11. The method of claim 10, wherein the analyzing step comprises:
determining a change in the sensed rotation speed; and
comparing said change to a stored reference value.

12. A method of calibrating a control clutch of a transmission having an input shaft connected to an engine and having an output shaft, the transmission have a plurality of control clutches, each control clutch having an input element for receiving torque and having an output element, the method comprising the following steps:
a) operating the engine at a predetermined speed;
b) applying a hold pressure to the clutch being calibrated;
c) fully engaging at least a second clutch so that all parts of the clutch being calibrated are rotating;
d) fully disengaging the second clutch;
e) sensing a rotation speed of a transmission element driven by the output element of the clutch being calibrated;
f) analyzing a parameter which is a function of the sensed rotation speed, and
g) if the analysis satisfies a predetermined criteria storing a value associated with the applied hold pressure as the calibration value; and
h) if the analysis does not satisfy said predetermined criteria, modifying the hold pressure and repeating steps b) through h).

13. The method of claim 12, wherein the analyzing step comprises:

determining the time required for the sensed rotation speed to decrease by a certain amount; and comparing the determined time period to a stored reference time period.

14. A method of calibrating a control clutch of a transmission having an input shaft connected to an engine and having an output shaft, the transmission have a plurality of control clutches, each control clutch having an input element for receiving torque and having an output element, the method comprising the following steps:

a) maintaining the transmission in a state such that substantially no torque is transmitted from the engine to the output shaft;

b) operating the engine at a predetermined speed;

c) fully engaging at least a second clutch to prevent rotation of the output element of the clutch being calibrated;

d) applying a hold pressure to the clutch being calibrated;

e) fully disengaging the second clutch;

f) sensing a rotation speed of a transmission element driven by the output element of the clutch being calibrated;

g) analyzing a parameter which is a function of the sensed rotation speed, and h) if the analysis satisfies a predetermined criteria storing a value associated with the applied hold pressure as the calibration value; and i) if the analysis does not satisfy said predetermined criteria, modifying the hold pressure and repeating steps c) through h).

15. The method of claim 14, wherein the analyzing step comprises:

determining the time required for the sensed rotation speed to increase by a certain amount; and comparing the determined time period to a stored reference time period.

16. The method of claim 14, further comprising:

between steps c) and d), sensing a rotation speed of a transmission element driven by the output element of the clutch being calibrated and preventing further operation of the method unless the sensed speed is less than a predetermined speed for a certain time period.

17. A method of calibrating a control clutch of a transmission having an input shaft connected to an engine and having an output shaft, the transmission have a plurality of control clutches, each control clutch having an input element for receiving torque and having an output element, the method comprising the following steps:

a) operating the engine at a predetermined speed;

b) applying a hold pressure to a second clutch which is coupled to the output element of the clutch being calibrated, the hold pressure being a pressure at which the second clutch begins to transmit torque therethrough;

c) applying full pressure to a third clutch coupled to the output element of the second clutch to prevent rotation of the output element of the second clutch;

d) applying full pressure to the clutch being calibrated for a fast-fill time period and applying sump pressure to the clutch being calibrated thereafter;

e) sensing a rotation speed of a transmission element driven by the output element of the clutch being calibrated;

f) analyzing a parameter which is a function of the sensed rotation speed, and if the analysis satisfies a predetermined criteria storing a value associated with the fast-fill time period as the calibration value, and if the analysis does not satisfy said predetermined criteria, modifying the fast-fill time period and repeating steps d) through f).

18. The method of claim 17, wherein the analyzing step comprises:

comparing the sensed rotation speed to a stored reference speed.

19. A method of calibrating a control clutch of a transmission having an input shaft connected to an engine and having an output shaft, the transmission have a plurality of control clutches, each control clutch having an input element for receiving torque and having an output element, the method comprising the following steps:

a) operating the engine at a predetermined speed;

b) applying a hold pressure to a second clutch which is coupled to the input element of the clutch being calibrated, the hold pressure being a pressure at which the second clutch begins to transmit torque therethrough;

c) applying full pressure to a third clutch coupled to the output element of the clutch being calibrated to prevent rotation of said output element;

d) applying full pressure to the clutch being calibrated for a fast-fill time period and connecting the clutch being calibrated to sump pressure thereafter;

e) sensing a rotation speed of a transmission element driven by the input element of the clutch being calibrated;

f) analyzing a parameter which is a function of the sensed rotation speed, and if the analysis satisfies a predetermined criteria storing a value associated with the fast fill time period as the calibration value, and if the analysis does not satisfy said predetermined criteria, modifying the fast fill time period and repeating steps d) through f).

20. The method of claim 19, wherein the analyzing step comprises:

determining a change in the sensed rotation speed; and comparing said change to a stored reference value.

* * * * *